(12) United States Patent
Ryan, Jr. et al.

(10) Patent No.: US 7,379,194 B2
(45) Date of Patent: May 27, 2008

(54) METHOD AND SYSTEM FOR DETERMINING MAIL PIECE DIMENSIONS USING SWEPT LASER BEAM

(75) Inventors: Frederick W Ryan, Jr., Oxford, CT (US); Ronald P Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 172 days.

(21) Appl. No.: 11/247,718

(22) Filed: Oct. 11, 2005

(65) Prior Publication Data
US 2007/0089529 A1  Apr. 26, 2007

(51) Int. Cl.
*G01N 21/86* (2006.01)
(52) U.S. Cl. ............... 356/625; 356/627; 356/628; 356/629; 356/630; 356/635; 250/559.19; 250/559.21; 250/559.22; 250/559.26
(58) Field of Classification Search ........ 356/625–640; 250/559.19–559.49
See application file for complete search history.

(56) References Cited

U.S. PATENT DOCUMENTS

| | | | |
|---|---|---|---|
| 4,929,843 A | 5/1990 | Chielewski, Jr. et al. | |
| 5,070,237 A | 12/1991 | Okuyama et al. | |
| 5,142,482 A | 8/1992 | Sansone | |
| 5,238,123 A | 8/1993 | Tovini et al. | |
| 5,539,675 A | 7/1996 | Carroll, Sr. et al. | |
| 5,703,783 A | 12/1997 | Allen et al. | |
| 5,727,692 A | 3/1998 | Large et al. | |
| 5,770,864 A * | 6/1998 | Dlugos ............... | 250/559.19 |
| 5,930,734 A | 7/1999 | Hofmann et al. | |
| 6,135,292 A | 10/2000 | Pettner | |
| 6,348,696 B1 | 2/2002 | Alt et al. | |
| 6,586,930 B1 | 7/2003 | Kumar et al. | |
| 6,655,683 B2 | 12/2003 | Engarto et al. | |
| 6,798,528 B1 | 9/2004 | Hartman | |
| 6,832,213 B2 | 12/2004 | Freeman et al. | |
| 2004/0227110 A1 | 11/2004 | Luxem et al. | |

FOREIGN PATENT DOCUMENTS

EP  1 267 143 A1  12/2002
EP  1306813  5/2003

* cited by examiner

*Primary Examiner*—Layla G. Lauchman
*Assistant Examiner*—Rebecca C Slomski
(74) *Attorney, Agent, or Firm*—Brian A. Lemm; Angelo N. Chaclas

(57) ABSTRACT

A method of measuring a mailpiece includes deflecting a laser beam through an arc, determining an angle at which the laser beam is currently directed, and calculating a dimension of the mailpiece based at least in part on the determined angle.

10 Claims, 7 Drawing Sheets

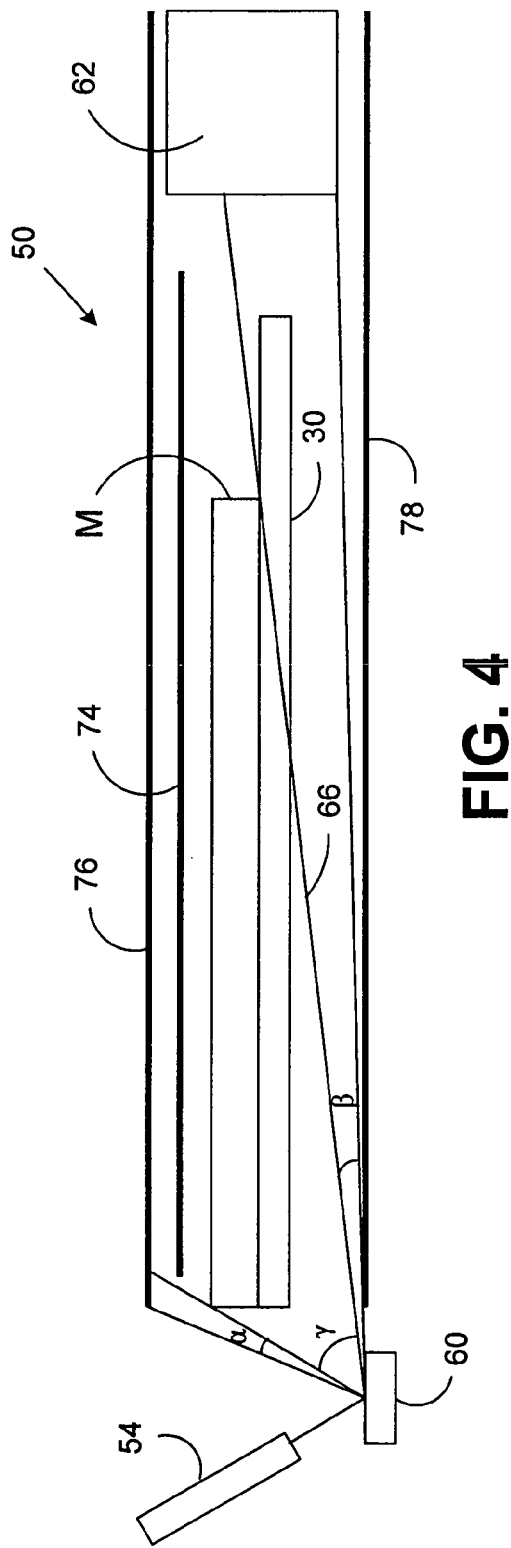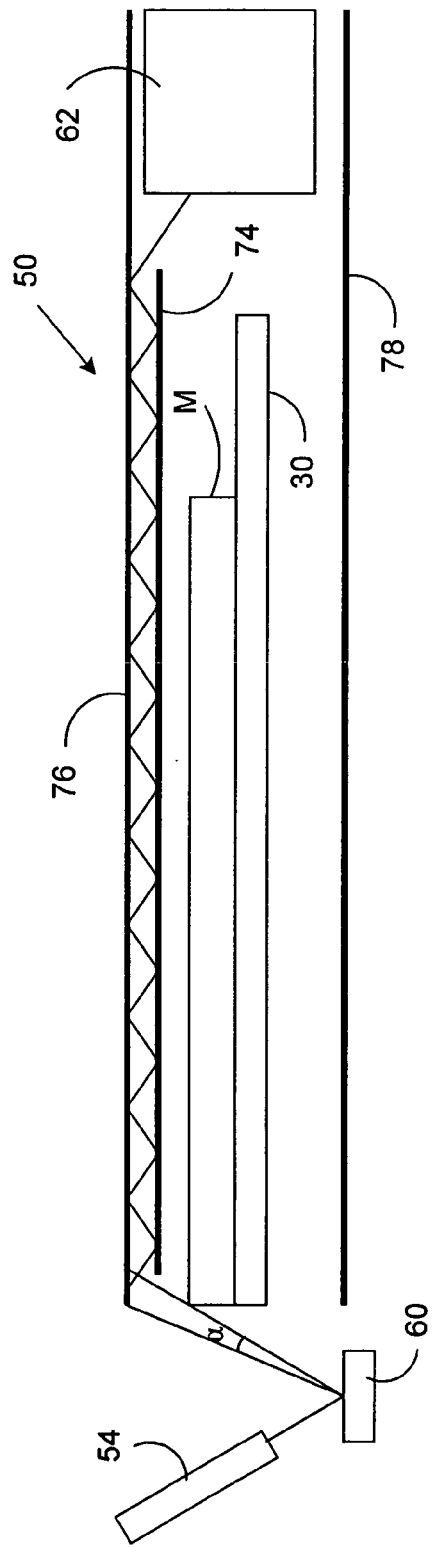

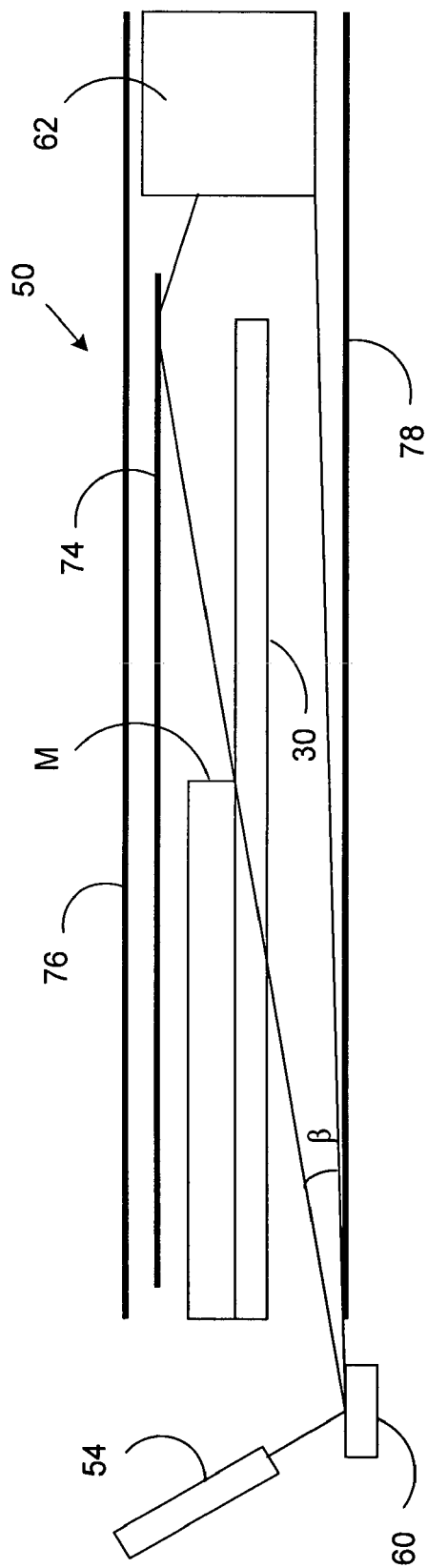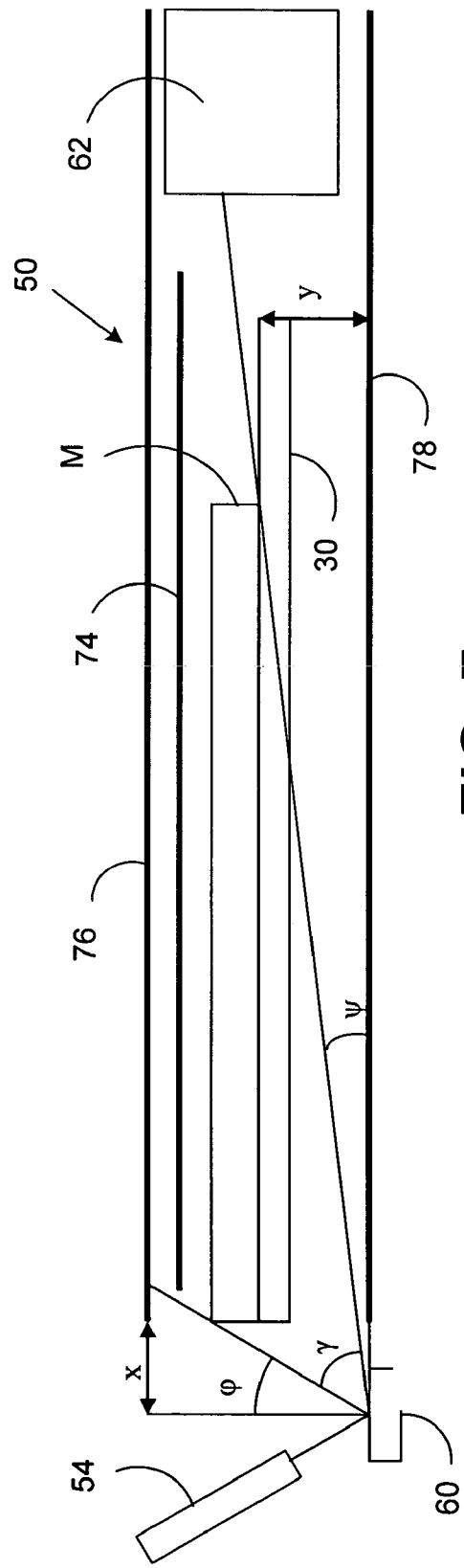

METHOD AND SYSTEM FOR DETERMINING MAIL PIECE DIMENSIONS USING SWEPT LASER BEAM

BACKGROUND

This invention relates generally to the field of determining postal charges for mailpieces, and more particularly to measuring dimensions of mailpieces for dimension-based postal rating schemes.

In the operation of many postal authorities, the postal charges assessed for carriage of letters are based on the weight of the letters. However, alternative schemes have been proposed in which postal charges may also be based on one or more dimensions of the letters, such as, for example, thickness of the letters. To facilitate operation of such schemes, it has been proposed to automatically measure the thickness of letters using sensors that physically contact the letters. However, such mechanisms may prove to be inaccurate or unreliable, or may be prone to jamming as letters are transported past the sensors.

Optical techniques for measuring at least one dimension of a letter have also been proposed. It would be desirable for an optical technique for measuring letter dimensions that it measure two or three dimensions, and/or that it not require complex image processing.

SUMMARY

Accordingly, an improved apparatus and method for measuring a mailpiece are provided. A method according to some embodiments includes deflecting a laser beam through an arc, determining an angle at which the laser beam is currently directed, and calculating a dimension of the mailpiece based at least in part on the determined angle.

The method may further include determining, during the deflecting, a point in time at which the laser beam begins or ceases to be blocked by the mailpiece, and the determining of the angle may be in response to determining the point in time. The calculated dimension may be the width or height (also referred to as the thickness) of the mailpiece. The deflecting may include controlling a steerable mirror to vary an angle at which the steerable mirror reflects the laser beam.

In another aspect, an apparatus includes a horizontal deck for supporting a mailpiece and a vertical registration wall adjacent the deck. The apparatus also includes a mechanism for transporting the mailpiece along the deck in a direction parallel to the registration wall. The apparatus further includes a beam source at an opposite side of the registration wall from the deck. The beam source is for emitting a laser beam. The deck has a deck window formed therein to allow the beam to pass through the deck. The registration wall has a wall window formed therein to allow the beam to pass through the registration wall. The apparatus also includes a sensor spaced from the registration wall on the same side of the registration wall as the deck. The sensor is for detecting the laser beam. The apparatus further includes a steering mechanism for deflecting the laser beam through an arc. The arc defines a plane that is substantially orthogonal to the deck and to the registration wall. In addition, the apparatus includes a first mirror positioned substantially parallel to and above the deck for selectively reflecting the beam toward the sensor, and a second mirror positioned substantially parallel to and above the first mirror for selectively reflecting the beam toward the sensor. The apparatus also includes a control mechanism for controlling the steering mechanism, for receiving an output signal from the sensor, and for calculating at least one dimension of said mailpiece based at least in part on the output signal from the sensor.

In another aspect, a method includes repeatedly deflecting a laser beam through an arc, transporting the mailpiece into the path of the laser beam, and determining a first point in time at which the mailpiece enters the path of the laser beam. The method further includes determining a second point in time at which the mailpiece begins to block the laser beam, and determining a first angle of deflection of the laser beam. The first angle of deflection corresponds to the second point in time. The method also includes calculating the width or height of the mailpiece based at least in part on the first angle of deflection. In addition, the method includes determining a third point in time, at which the mailpiece ceases to block the laser beam, and determining a second angle of deflection of the laser beam. The second angle of deflection corresponds to the third point in time. Still further, the method includes calculating the other one of the height or width of the mailpiece based at least in part on the second angle of deflection. Also the method includes determining a fourth point in time, at which the mailpiece exits from the path of the laser beam. The method further includes calculating a length of the mailpiece based on the first point in time, the fourth point in time, and the speed at which the mailpiece is transported.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 4-7 are views similar to FIG. 3, illustrating various aspects of interaction between the measuring module and a mailpiece.

DETAILED DESCRIPTION

In accordance with some aspects of the invention, a laser beam is swept through an arc by operation of a steerable reflection device, such as, for example, a mirror, which reflects the laser beam. A mailpiece to be measured intercepts a portion of the arc. From the points of interception, width and height of the mailpiece are calculated. The time required for the mailpiece to pass the beam path, taken with the speed at which the mailpiece is transported, is used to calculate the length of the mailpiece.

Figure 1:
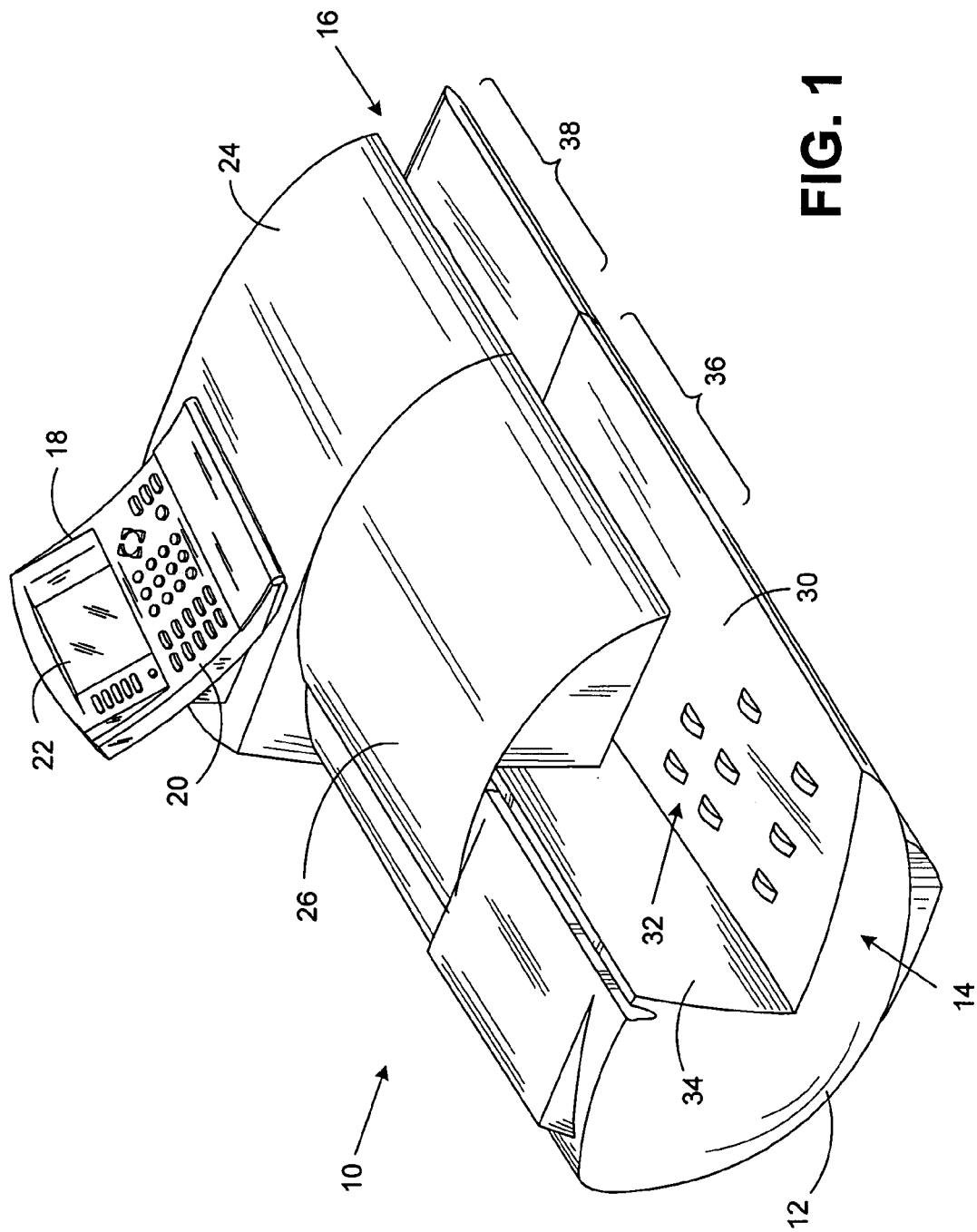
FIG. 1 is a perspective view of a typical mailing machine in which the principles of the present invention can be utilized.

Referring now to the drawings, and particularly to FIG. 1, the reference numeral 10 indicates generally a typical mailing machine in which the principles of the present invention can be utilized. The mailing machine 10 includes a base unit generally designated by the reference numeral 12. The base unit 12 has an envelope infeed end, generally designated by the reference numeral 14 and an envelope outfeed end, designated generally by the reference numeral 16. A control unit 18 is mounted on the base unit 12, and includes one or more input/output devices, such as, for example, a keyboard 20 and a display device 22.

Cover members 24, 26 are pivotally mounted on the base 12 and are moveable between a closed position shown in FIG. 1 and an open position (not shown). In the open position of the cover members 24, 26, various operating components and parts are exposed for service and/or repair as needed. A mailpiece transport mechanism which is not visible in FIG. 1 is housed under the cover members 24, 26. A module for measuring mailpieces (i.e., letters, envelopes) in accordance with principles of the present invention is described below and is housed under the cover member 26.

The base unit 12 further includes a generally horizontal feed deck 30 which extends substantially from the infeed end 14 to the outfeed end 16. A plurality of nudger rollers 32 are suitably mounted under the feed deck 30 and project upwardly through openings in the feed deck so that the rollers 32 can exert a forward feeding force on a succession of mailpieces placed in the infeed end 14. A vertical wall 34 defines a mailpiece stacking location from which the mailpieces are fed by the nudger rollers 32 along the feed deck 30 and into the transport mechanism referred to above. The transport mechanism transports the mailpieces through one or more modules, such as a separator module, a moistening/sealing module and a mailpiece measuring module provided in accordance with principles of the invention. Each of these modules is located generally in the area indicated by reference numeral 36. The mailpieces are then passed to a metering/printing module located generally in the area indicated by reference numeral 38.

Figure 2:
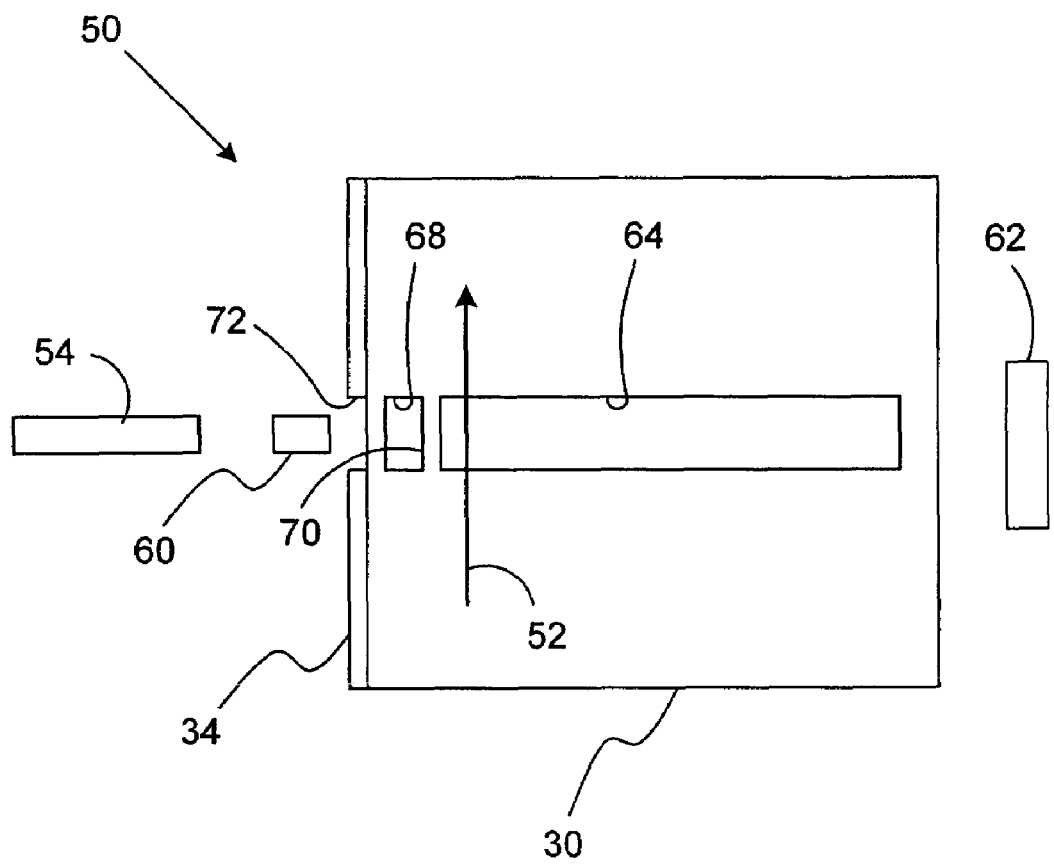
FIG. 2 is a partial schematic plan view of a mailpiece measuring module that is part of the mailing machine of FIG. 1.
Figure 3:
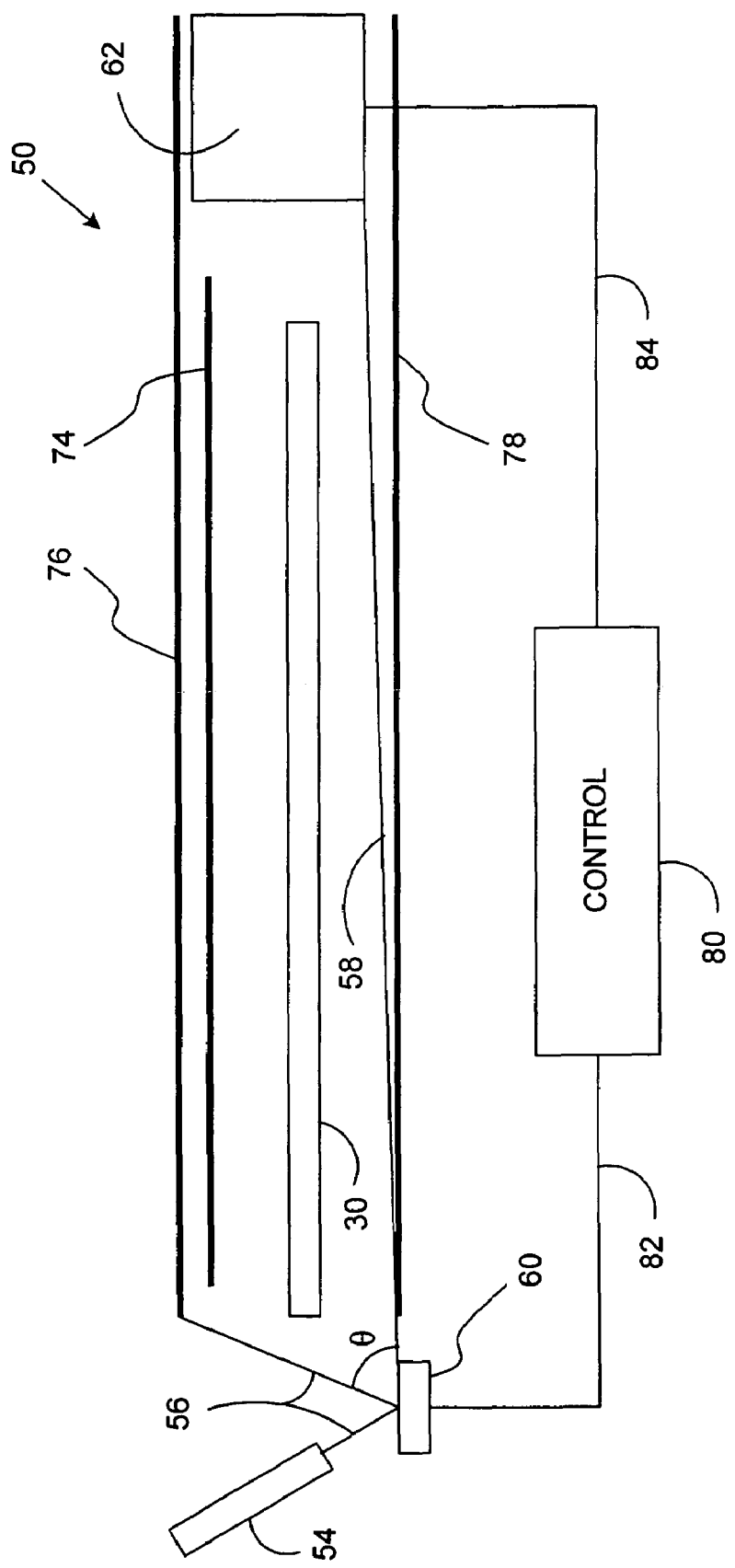
FIG. 3 is a partial schematic side view of the mailpiece measuring module of FIG. 2.

FIG. 2 is a partial schematic plan view of a mailpiece measuring module 50 that is part of the mailing machine 10. The above-mentioned feed deck 30 is generally horizontal and is part of the mailpiece measuring module 50 and supports a mailpiece M (FIGS. 4-7, not shown in FIG. 2) which is transported along the deck 30 and through the mailpiece measuring module 50 by a transport mechanism schematically represented by arrow 52 (FIG. 2). The transport mechanism 52 may operate in accordance with conventional principles, and may include one or more drive belts, idler or driving rollers, etc. The mailpiece measuring module 50 also includes the above-mentioned vertical wall 34, also referred to as the registration wall, because the inner edge of the mailpiece M is registered against the wall 34 by the transport mechanism 52. It will be noted from FIG. 2 that the direction in which the transport mechanism transports the mailpiece is parallel to the registration wall 34.

FIGS. 3-7 are partial schematic side views of the mailpiece measuring module 50. In particular, to simplify those drawings the registration wall 34 (FIG. 2) is omitted therefrom.

Referring to FIGS. 3-7, the mailpiece measuring module 50 also includes a laser 54. The laser 54 functions as a source of a laser beam (indicated, e.g., at 56 or 58 in FIG. 3) which is emitted by the laser 54. As best seen in FIG. 2, the laser 54 is located at an opposite side of the registration wall 34 from the deck 30. Also, the mailpiece measuring module 50 includes a device for deflecting the laser beam from laser 54 through an arc, such as, for example, a steerable mirror 60, located at an elevation below the laser 54 and the deck 30 and located between the laser 54 and the registration wall 34. The mailpiece measuring module 50 further includes a sensor 62 which is spaced from the registration wall 34 and is on the same side of the registration wall 34 as the deck 30. The sensor 62 is operative to detect the laser beam 56 or 58 emitted by the laser 54. Since laser beams have a diameter which varies with the distance form the laser, the sensor 62 preferably detects the center of the laser beams 56, 58. The deck 30 has a first deck window 64 (FIGS. 2 and 9, not indicated in the other drawings) formed therein to allow the laser beam to pass through the deck, as indicated for example at 66 in FIG. 4. In addition, in some embodiments the deck 30 also has a second deck window 68 (FIGS. 2 and 9, not indicated in the other drawings) formed therein. The second deck window is located between the first deck window 64 and the registration wall 34. A bar 70 is defined in the deck 30 between the windows 64, 68. As will be seen, the bar 70 and/or the window 68 may be useful in connection with a calibration procedure.

The registration wall 34 has a window 72 (FIG. 2) formed therein to allow the laser beam to pass through the registration wall. One or more of the windows 64, 68, 72 may be filled with a transparent material, such as clear plastic, so that the mailpiece is not likely to be snagged by the windows. However, it is also contemplated that one or more of the windows may be left open.

Referring now to FIGS. 3-7, the mailpiece measuring module 50 may also include three reflecting devices, such as, for example, mirrors 74, 76, 78. Mirror 74 is positioned substantially parallel to the deck 30 and a short distance above the deck 30. Mirror 76 is positioned substantially parallel to the deck 30 and the mirror 74 and a short distance above the mirror 74. Mirror 78 is positioned substantially parallel to the deck 30 and to mirrors 74, 76 and below the deck 30. For example, mirror 78 may be at about the same elevation of the steerable mirror 60. Preferably, the mirrors 60, 74, 76, 78 are provided with some type of anti-reflection coatings on their surfaces to reduce any secondary scan spots/beams (thus leaving only the primary scan spots/beams).

Mirror 74 may, in some embodiments, be a partially reflective mirror, i.e., mirrored on both its top and bottom surfaces (which face in opposite directions to each other). In other embodiments, mirror 74 may be a "one-way" mirror, such that the top surface is mirrored and the bottom surface is transmissive of the laser beam. In such embodiments, the mirror 74 transmits the laser beam when the beam impinges on the mirror 74 from below and reflects the laser beam when the beam impinges on the mirror 74 from above. It may be possible in such embodiments to omit the mirror 78. The mirror 76 is reflective on its bottom surface and the mirror 78 is reflective on its top surface. In the case of all three mirrors, it may be said that they "selectively" reflect the laser beam toward the sensor 62 in the sense that sometimes during operation of the mailpiece measuring module 50, one or more of the mirrors may so reflect the laser beam. Mirrors 74 and 76 could also be replaced by a solid "light pipe" where the total internal reflection conducts and redirects the moving laser beam towards the sensor 62 in a near lossless way. The entrance and exit windows of the "pipe" could be coated with a suitable anti-reflection coating chosen for the wavelength of the laser.

The mailpiece measuring module 50 also includes a control circuit (schematically indicated at 80 in FIG. 3), which may for example be microprocessor-based. The control circuit 80 is coupled by a control signal path 82 to the steerable mirror 60 to allow the control circuit 80 to control the steerable mirror 60. Under the control of the control circuit 80, the angle at which the steerable mirror 60 reflects the laser beam is varied so that the beam is deflected (i.e., swept) through an arc that is indicated by the angle θ in FIG. 3. This arc may define a plane that is substantially orthogonal to the deck 30 and the registration wall 34. The control circuit 80 is also coupled to the sensor 62 by a signal path 84 to allow the control circuit to receive a signal output from the sensor 62. The latter signal indicates whether or not the sensor 62 currently detects the laser beam. As will be seen, the control circuit is operative to calculate the dimensions of a mailpiece M (FIGS. 4-7) based on the output signal from the sensor 62 and based, in the case of some dimensions, on the angle at which the steerable mirror currently reflects the laser beam.

The control circuit 80 may also be coupled to the laser 54 to control turning the laser on and off. Further, the control circuit 80 may be coupled to the transport mechanism 52 (FIG. 2) to control turning the transport mechanism on and off. In addition, both the transport mechanism and scanning mirror may provide pulsed of analog timing information used to support calculation of the mail piece dimensions. In addition, the control circuit 80 may receive input from a user of the mailing machine 10 via the control unit 18 (indeed, the control circuit 80 may be part of the control unit 18). Still further, the control circuit may provide a rate setting to the above-mentioned metering/printing module based on the dimensions of the mailpiece as calculated by the control circuit 80. Connections to support the functionality described in this paragraph are omitted to simplify the drawing.

Geometric aspects of the mailpiece measuring module 50 will now be discussed, initially with reference to FIGS. 4-6. As seen from FIG. 4, the presence of the mailpiece M blocks the laser beam from reaching the sensor 62 at times when the laser beam is swept through the portion of its arc indicated by angle γ. However, before the beam is swept to that part of the arc (i.e., while it is within the angle β), the beam does reach the sensor 62, as seen from FIG. 6. Similarly, as seen from FIG. 5, after the beam has passed through the part indicated by angle γ (i.e., while the beam is within the angle α), the beam also reaches the sensor 62. (In the foregoing discussion, it is assumed that the beam is swept in the counterclockwise—that is upward—direction as seen in the drawings. However, the beam may alternatively be swept in the clockwise—or downward—direction.) It will be recognized that the angular extent of the angle α depends on the height (thickness) of the mailpiece and that the angular extent of the angle β depends on the width of the mailpiece.

FIG. 7 indicates more specifically the geometric bases for calculating the mailpiece dimensions. In FIG. 7, the distance y is the vertical distance between the elevation of the steerable mirror 60 and the elevation of the top surface of the deck 30. The distance x is the horizontal distance between the locus at which the laser beam strikes the steerable mirror and the outer surface of the registration wall. The width w (not indicated in FIG. 7) of the mailpiece is the horizontal dimension of the mailpiece in the direction orthogonal to the direction in which the mailpiece is transported. The height h of the mailpiece is the vertical dimension of the mailpiece. The angle ψ is measured from the horizontal to the angle of deflection of the laser beam at which the beam just begins (or ceases, if clockwise beam-sweeping is used) to be blocked by the mailpiece. As a result, we have the trigonometric equation:

$$\tan \psi = y/(w+x) \qquad \text{Eq. (1)}$$

Solving for w in equation (1) yields:

$$w = (y/\tan \psi) - x \qquad \text{Eq. (2)}$$

The angle φ is measured from the vertical to the angle of deflection of the laser beam at which the beam just ceases (or begins, if clockwise beam-sweeping is used) to be blocked by the mailpiece. Consequently we have the trigonometric equation:

$$\tan \phi = x/(h+y) \qquad \text{Eq. (3)}$$

which may be solved for h to yield:

$$h = (x/\tan \phi) - y \qquad \text{Eq. (4)}$$

The distances x and y may be determined from the design of the mailpiece measurement module and/or from a calibration procedure. The angles ψ and φ may be determined from the controlled state of the steerable mirror at times when the sensor begins or ceases to detect the laser beam.

Figure 8:
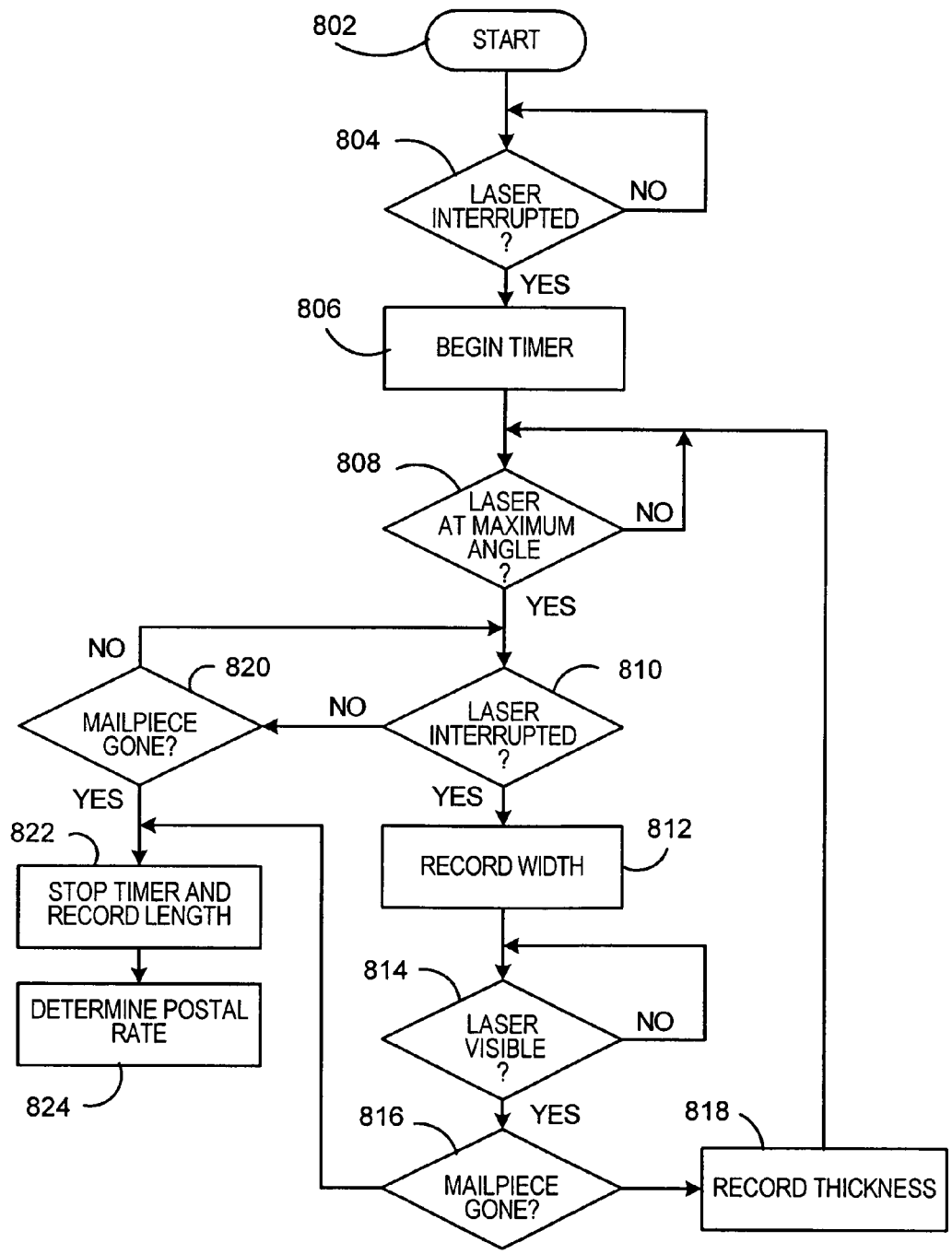
FIG. 8 is a flow chart that illustrates a process that may be performed by the mailpiece measuring module.

FIG. 8 is a flow chart that illustrates a process that may be performed by the mailpiece measuring module 50.

The process of FIG. 8 starts at 802, at which point the transport mechanism 52 is operating to transport any mailpiece fed into the mailing machine along the feed path and into the path of the laser beam. Also, the laser 54 is on and the steerable mirror 60 is repeatedly operated (e.g., virtually continuously) to deflect the laser beam emitted by the laser 54 through the arc referred to above in connection with FIG. 3. At decision block 804, it is determined whether the laser beam has been blocked at a point in time when the beam would normally be received by the sensor 62. If so, then (as indicated at 806) a timer function begins to operate within the control circuit 80. Thus, at 804, the control circuit 80 determines, based on output of the sensor 62, a point in time at which a mailpiece enters the path of the laser beam.

At 808 it is determined whether a sweep of the laser beam has been completed. Then, at 810, it is determined whether the laser beam has again been blocked by the mailpiece. If blocking of the laser beam is detected at 810, the control circuit 80 thereby determines, based on the output of the sensor 62, a point in time at which the blocking of the laser beam began. From that point in time, and the known controlled state of the steerable mirror at that point in time, the control circuit 80 determines the angle ψ shown in FIG. 7 and referred to in Equations (1) and (2). From Equation (2) the control circuit 80 calculates the width of the mailpiece, as indicated at 812 in FIG. 8.

Then, at 814, it is determined whether, as the sweeping of the laser beam continues, the laser beam again becomes visible to the sensor 62. In other words, at 814 the control circuit determines, based on the output of the sensor 62, a point in time at which the mailpiece ceases to block the laser beam. If the laser is again found to be visible at 814, then it is next determined, at 816, whether the mailpiece has exited the path of the laser beam. (For example, such a determination may be made if a complete sweep of the laser beam occurs without blocking of the beam as would be expected if a mailpiece were present or if the laser is visible while it is passing through the deck close to the registration wall 34.) If it is determined that the mailpiece has not exited the path of the laser beam, then the control circuit 80 determines the angle φ shown in FIG. 7 from the point in time determined at 814 and from the known controlled state of the steerable mirror at that point in time. It will be recalled that the angle φ appears in Equations (3) and (4). With angle φ now known, the control circuit 80 may use Equation (4) to calculate the height of the mailpiece, as indicated at 818 in FIG. 8.

The loop of steps 808-818 may be repeated a number of times, as the mailpiece continues to be transported through the path of the laser beam. The width and height measurements may be re-calculated, and thereby checked, at each reiteration of the loop. If the calculated width is not stable (e.g., it steadily increases or decreases) the control circuit may reach a determination that the mailpiece is skewed (i.e., not properly registered against the registration wall 34) so that the width measurement (and possibly also the height measurement) is not reliable. Alternatively, based upon varying width measurements the control circuit 80 may determine that the mail piece is irregularly shaped (e.g., a round CD mailer) and should have a premium postage rate applied. The loop ends when either it is determined at 816 that the mailpiece has exited the path of the beam, or when the laser is never interrupted through a full sweep, as determined at 810 and 820. In either case, upon detecting that the mailpiece has exited from the beam path, the resulting point in time is determined to stop the timer function (822 in FIG. 8). The control circuit then uses the timer value (which is based on the point of time determined at 804 and the point of time determined at 816 or 820) to calculate the length of the mailpiece, by also using the known speed at which the transport mechanism 52 transports the mailpiece through the mailpiece measuring module 50. At 824, the control circuit 80 determines a postal rate for the mailpiece, based on one or more of the dimensions determined at 812, 818 and 822. The resulting postal rate may then be used to set the metering/printing module.

The above description of the process of FIG. 8 assumes that the laser beam is swept in the counterclockwise direction as seen in FIG. 7. If instead the beam is swept in the clockwise direction, the height would be determined at 812 (when the beam is first blocked in the sweep) and the width would be determined at 818 (when the beam is no longer blocked).

Figure 10:
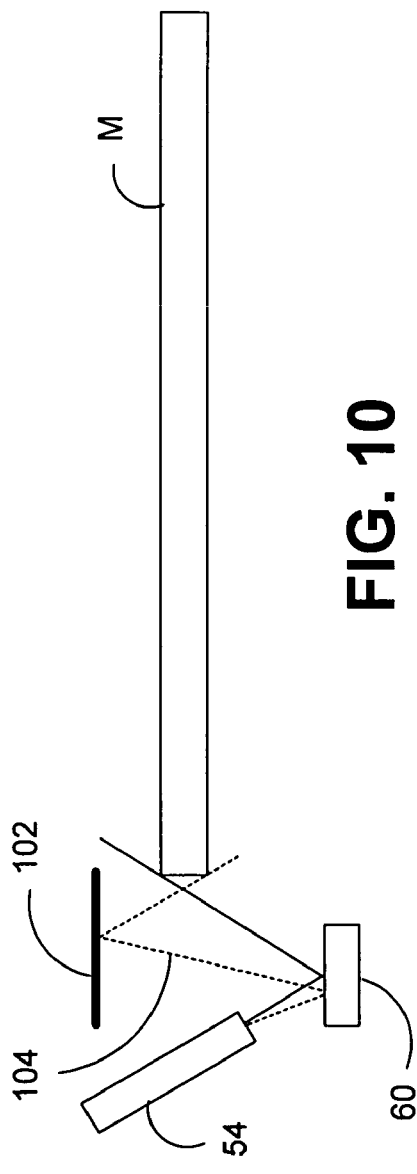
FIG. 10 is a view similar to FIG. 3, with additional components removed and showing an alternative embodiment of the mailpiece measuring module.

In the drawings, the mailpiece M has been depicted as a rectangular prism. However, in practice, many mailpieces may be tapered at the edges. If the mailpiece is tapered, the effect of the geometry illustrated in FIG. 7 would be to cause the calculated values for the width and height to be understated. The understatement of the width is not likely to be of great significance, but the understatement of the height may be significant. To address this issue, the mailpiece measuring module may include a second steerable mirror 102 above the first steerable mirror 60, as shown in FIG. 10. The first steerable mirror 60 may be controlled during a measurement cycle to be held in a fixed position during part of the cycle to reflect the beam to the second steerable mirror 102, as indicated by the beam path 104 (indicated as a dashed line). While the first steerable mirror 60 is in the fixed position, the second steerable mirror 102 may be controlled to sweep the beam through a small arc to provide another data point regarding the apparent height of the mailpiece. If the two height data points are close to matching, the control circuit may conclude that the mailpiece is tapered and that the apparent height should be doubled to estimate the actual height of the mailpiece.

In some embodiments, in addition to or instead of using a second steerable mirror, a known or predetermined adjustment factor may be applied to the calculated height of the mailpiece to produce an estimate of the mailpiece height.

Figure 9:
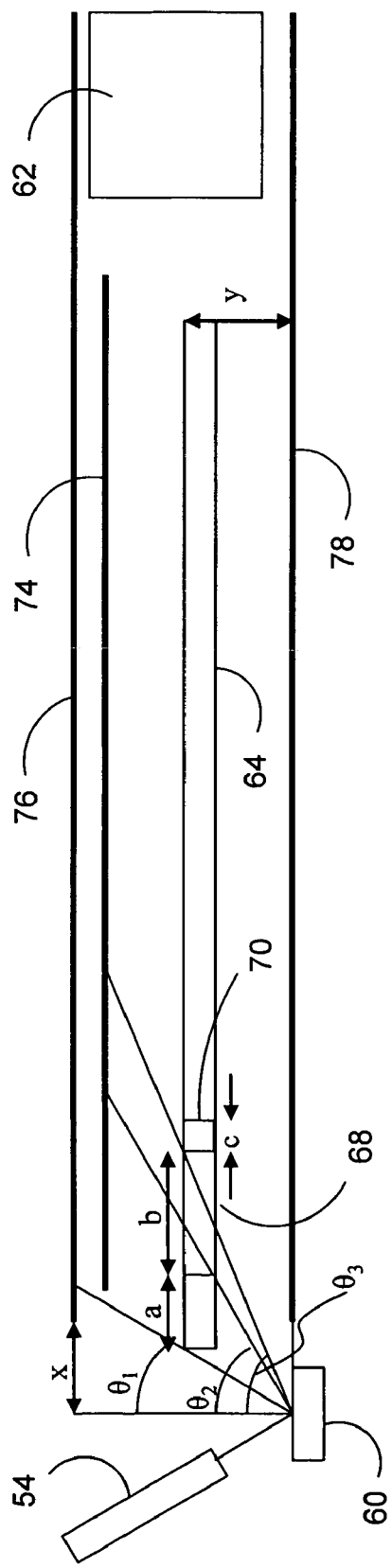
FIG. 9 is a view similar to FIG. 3, illustrating aspects of a calibration procedure that may be employed in the mailpiece measuring module.

FIG. 9 illustrates how the mailpiece measuring module may perform a calibration procedure in accordance with some embodiments. Such a procedure may be performed when no mailpiece is present. For purposes of such a procedure, the laser may be swept to ascertain the angular values of the angles $\theta_1$ and $\theta_3$ shown in FIG. 9. (For other calibration procedures, the angle $\theta_3$ may also be measured.)

The above-referenced distance x (Equations (1)-(4)) may be calculated from the following equation:

$$x = ((a+b)*\tan\theta_1)/(\tan\theta_3 - \tan\theta_1) \qquad \text{Eq. (5)},$$

where a is the horizontal distance from the registration wall to the inner edge of the window 68 and b is the width of the window. Both a and b may be known dimensions of the deck, and may be carefully controlled during manufacture of the deck.

The distance y may be calculated as follows:

$$y = (a+b)/(\tan\theta_3 - \tan\theta_1) \qquad \text{Eq. (6)}.$$

In accordance with other calibration procedures, the values of the angles $\theta_1$, $\theta_2$, $\theta_3$ may be stored upon initial installation of the mailing machine. Thereafter, at certain intervals, one or more of the angles $\theta_1$, $\theta_2$, $\theta_3$ may be re-measured from time to time to determine whether a change in the module geometry, such as an angular offset in the steerable mirror 60, has occurred.

In some embodiments, the steerable mirror 60 may be replaced by a fixed mirror, and the laser 54 may be mounted in a mechanism that allows the laser 54 to be rotated to sweep the laser beam through the desired angle. If a rotatable laser is employed, it may be positioned below the deck (but still on the opposite side of the registration wall from the deck), so that no fixed mirror is required in place of the steerable mirror 60.

In some embodiments, one or more of the mirrors 74, 76, 78 may be replaced by other components, such as, for example, lightguides or lenses. Also, curved mirrors (e.g., concave mirrors) may be used in place of the flat mirrors 74, 76, 78 shown in the drawings.

In some embodiments, the laser beam may not be swept until the mailpiece reaches the beam path, and the detection of the mailpiece reaching the path may be accomplished by keeping the beam in a fixed position that would be blocked by any mailpiece that is transported through the mailpiece measurement module.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. In a mailing machine having a horizontal feed deck and a vertical registration wall adjacent said deck, a method of measuring a mailpiece being supported on a top surface of the feed deck and registered against an outer surface of the registration wall, the method comprising:

sweeping a laser beam from a laser through an arc by controlling a steerable mirror to vary an angle at which the steerable mirror reflects the laser beam, the steerable mirror being located at an elevation below the feed deck and between the laser and the registration wall;

reflecting the laser beam toward a sensor using a first reflecting device and a second reflecting device;

determining a first angle at which the laser beam is directed, based on a response of the sensor, when the laser beam is blocked by the mailpiece and is not detected by the sensor;

determining a second angle at which the laser beam is directed, based on a response of the sensor, when the laser beam ceases to be blocked by the mailpiece and is detected by the sensor;

calculating a first dimension of the mailpiece based on the first angle, a vertical distance between the steerable mirror and the top surface of the feed deck, and a horizontal distance between a locus at which the laser beam strikes the steerable mirror and the outer surface of the registration wall; and calculating a second dimension of a mailpiece based on the second angle, the vertical distance between the steerable mirror and the top surface of the feed deck, and the horizontal distance between the locus at which the laser beam strikes the steerable mirror and the outer surface of the registration wall.

2. The method according to claim 1, wherein the first dimension is a width or height of the mailpiece.

3. The method according to claim 1, wherein the second dimension is a width or height of the mailpiece.

4. The method according to claim 1, further comprising:
calculating a postal rate for the mailpiece using at least one of the first and second dimensions.

5. The method according to claim 1, further comprising:
calculating a postal rate for the mailpiece using both of the first and second dimensions.

6. Apparatus for measuring a mailpiece, the apparatus comprising:

a horizontal deck for supporting a mailpiece, said deck having a deck window formed therein to allow a laser beam to pass through said deck;

a vertical registration wall adjacent said deck, said registration wall having a wall window formed therein to allow said laser beam to pass through said registration wall;

means for transporting the mailpiece along said deck in a direction parallel to said registration wall;

a beam source at an opposite side of said registration wall from said deck, said beam source for emitting said laser beam;

a sensor spaced from said registration wall on the same side of said registration wall as said deck, said sensor for detecting said laser beam;

steering means for steering said laser beam through an arc, said arc defining a plane that is substantially orthogonal to said deck and to said registration wall;

a first reflecting device positioned substantially parallel to and above said deck for selectively reflecting said beam toward said sensor, said first reflecting device including a mirror having two mirrored surfaces facing in opposite directions from each other;

a second reflecting device positioned substantially parallel to and above said first reflecting for selectively reflecting said beam toward said sensor; and control means for controlling said steering means, for receiving an output signal from said sensor, and for calculating at least one dimension of said mailpiece based at least in part on said output signal from said sensor.

7. The apparatus according to claim 6, wherein said steering means includes a steerable mirror located at an opposite side of said registration wall from said deck.

8. The apparatus according to claim 7, further comprising:
a third reflecting device positioned substantially parallel to and below said deck for selectively reflecting said beam toward said sensor.

9. The apparatus according to claim 8, wherein said steerable mirror is a first steerable mirror, and further comprising a second steerable mirror located on the same side of said registration wall as said first steerable mirror, said first steerable mirror at an elevation less than an elevation of said deck, said second steerable mirror at an elevation greater than the elevation of said deck.

10. The apparatus according to claim 6, wherein said deck window is a first deck window, said deck having a second deck window formed therein between said first deck window and said registration wall.

* * * * *